(12) United States Patent
Spies et al.

(10) Patent No.: US 7,716,132 B1
(45) Date of Patent: May 11, 2010

(54) MECHANISM FOR EXPRESS ENROLLMENT OF A USER WITH AN ONLINE BILL PAYMENT SERVICE

(75) Inventors: Wendy Spies, San Mateo, CA (US); Craig LaSalle, Los Altos, CA (US); Anne Brosnahan, Sunnyvale, CA (US); Michael Klieman, Belmont, CA (US)

(73) Assignee: Intuit Inc., Mountain View, CA (US)

( * ) Notice: Subject to any disclaimer, the term of this patent is extended or adjusted under 35 U.S.C. 154(b) by 406 days.

(21) Appl. No.: 11/401,983

(22) Filed: Apr. 11, 2006

(51) Int. Cl.
*G06Q 40/00* (2006.01)

(52) U.S. Cl. .......................................... 705/42; 705/43

(58) Field of Classification Search ............... 705/42–43
See application file for complete search history.

(56) References Cited

U.S. PATENT DOCUMENTS

2001/0032182 A1* 10/2001 Kumar et al. .................. 705/40
2004/0236681 A1* 11/2004 Modigliani et al. ........... 705/39

* cited by examiner

*Primary Examiner*—Thu Thao Havan
(74) *Attorney, Agent, or Firm*—Gunnison, McKay & Hodgson, L.L.P.; Philip J. McKay

(57) ABSTRACT

A system, method, and a computer program product that enrolls a user with a bill payment service without requiring a user to provide account information.

10 Claims, 4 Drawing Sheets

MECHANISM FOR EXPRESS ENROLLMENT OF A USER WITH AN ONLINE BILL PAYMENT SERVICE

BACKGROUND

The present invention relates to enrolling a user with a bill payment service.

It has become commonplace for individuals to use online bill payment services to pay bills. Moving bill payment online eased lives of individuals in many different ways. Paying bills online allows individuals not only switch from writing checks to issuing payment instructions online, but also to stay organized. For example, online bill payment services allow individuals to have a better sense of their personal finances. In addition, online bill payment services save a great deal of time. A person only needs to enter his account number and address the first time he pays the bills, and the service remembers all the information.

Setting up an account with a bill payment service, however, requires a user to provide a significant amount of personal information, such as name, date of birth, Social Security Number, as well as funding information (e.g., account number and routing number). Both authentication information and funding information are used by the bill payment service to check the identity of the enrollee and to eliminate a possibility of fraud. Typically, to achieve the first goal—verifying the identity of the enrollee—a bill payment service scrapes the enrollee's information from a web site of a financial institution for which an account number was provided and compares it to the information provided by the individual. If the authentication information is correct, the server authenticates the user and enrolls the user with the bill payment service.

To accomplish the second goal—checking the validity of the funding account—a bill payment service scrapes account information from the financial institution's web site using the user's ID and password provided by the user, thereby confirming that the user has access to the web site of the financial institution (and therefore to the accounts for that user ID). This approach has the well-known problem that users do not want to spend time entering a large amount of personal data to enroll with any kind of online service, including a bill payment service. In addition, entering account number and routing number is error-prone, which inevitably leads to data entry mistakes.

SUMMARY

In various embodiments the present invention provides methods, systems, and computer programs that perform enrollment of a user with a bill payment service without requiring a user to provide account information.

A user initiates a process of enrollment with the bill payment service system to automatically pay bills. A bill payment application executed at a user's computer prompts the user to provide a name of a financial institution at which the user maintains one or more accounts. The bill payment application requests that the user provide authentication information to establish connection with one or more selected financial institutions. A user provides to the bill payment application a user ID and password for the financial institution. The bill payment application establishes connection with the financial application to obtain the user's account information. The financial institution validates the user ID and password and provides the user account number and routing number to the bill payment application. The bill payment application uses the received account information to enroll a user with the bill payment service system. Since the user account information is provided programmatically from the financial institution rather than directly from a user, this eliminates the possibility of fraud.

The features described in this summary and the following detailed description is not all-inclusive. Many additional features will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1:
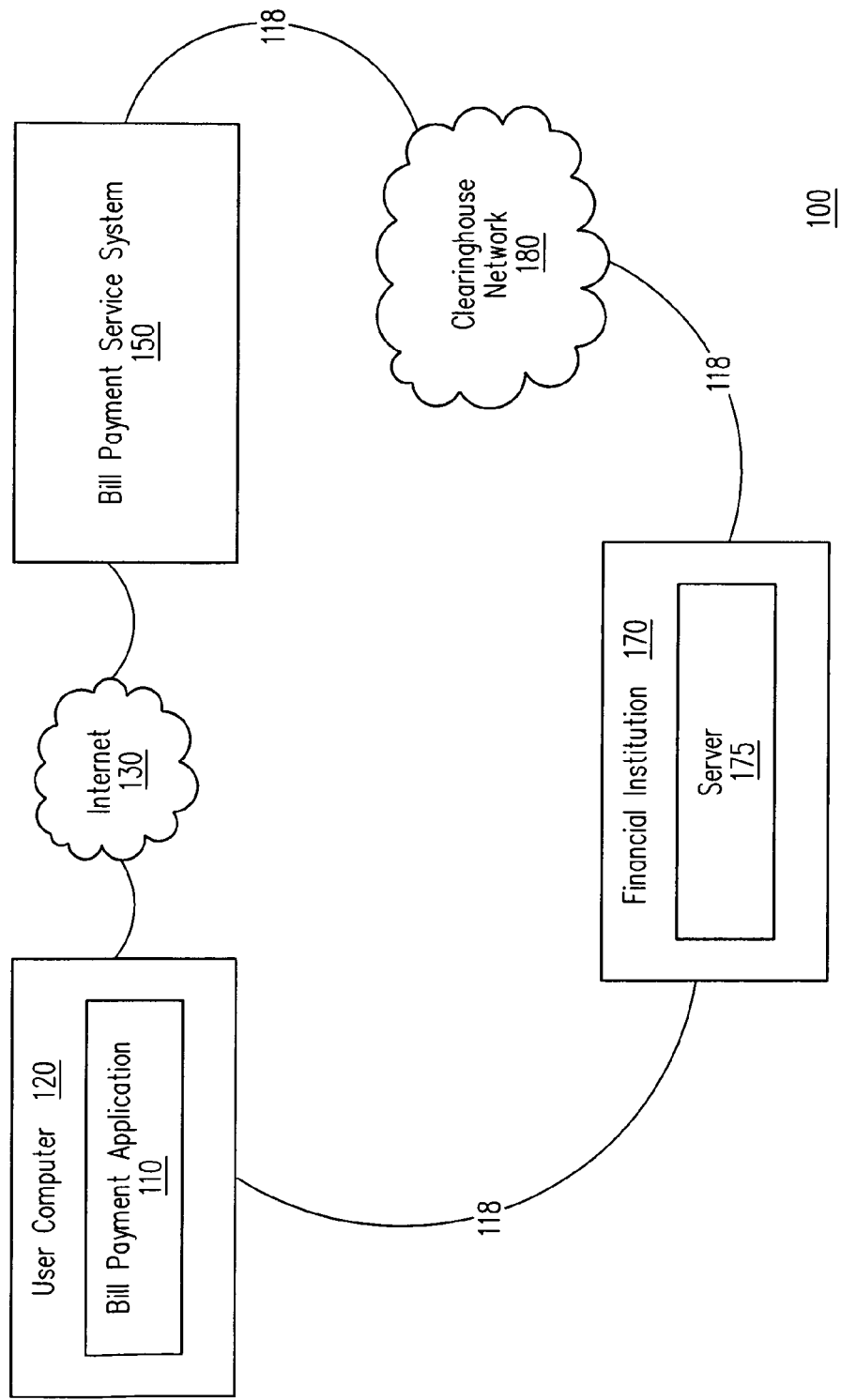
FIG. 1 is a high-level block diagram illustrating an environment for express bill payment process.

FIG. 1 is a high-level, block diagram illustrating an environment 100 for enrolling a user with a bill payment service system 150 according to one embodiment. The environment includes a user computer 120 executing a bill payment application 110, a bill payment service system 150, a financial institution 170, and a clearinghouse 180.

The bill payment service system 150 represents an entity that allows users of computer 120 to pay bills. System 150 can be operated by CheckFree Corporation of Atlanta, Ga., by Metavante, of Brown Deer, Wis., or any other company that provides bill payment services. A system architecture of the bill payment service system 150 is described below in reference to FIG. 4. The bill payment service system 150 could use various mechanisms to pay the bills. For example, system 150 can issue a check drawn on the user's account at the user's financial institution 170 and send the check to a creditor. The bill payment service system 150 can issue an electronic transfer payment. To this end, the clearing house 180, a system that processes electronic payments on behalf of financial institutions, debits the user's account and credits the creditor's account.

The financial institution 170 could be a securities brokerage company, a bank, a credit unit, or a credit card company. A user of user computer 120 has one or more accounts with the financial institution 170. Although only one financial institution 170 is shown in FIG. 1, a person of ordinary skill in the art would understand that a user can be affiliated with any number of financial institutions. Financial institution 170 includes a front end server 175 for interfacing with the bill payment service system 150 and the bill payment application 110 via a communications protocol such as Open Financial Exchange ("OFX", Specification 2.1, available at www.ofx.net). A legacy system 177 maintains user financial information, such as an account type, an account number, and a routing transit number. The legacy system 177 also maintains user login information, e.g., user ID and password, for accessing online account information. A "user" can be an individual, a group of individuals (e.g., a family), or a business. Thus, the user computer 120 can be any computer operated by any such user, including computers operated by businesses. In this regard, a user uses the bill payment service system 150 to pay its accounts payable (e.g., its vendors).

The user computer 120 is a computing system of any design or form factor, and includes a processor, an addressable memory, and other features (not illustrated) such as a display, local memory, input/output ports, and a network interface. In another embodiment one or more of the components of the user computer 120 may be located remotely and accessed via a network, e.g., 118. The network interface and a network communication protocol provide access to a network 118, along with access to the Internet, via a TCP/IP type connection, or to other network embodiments, such as a LAN, a WAN, a wired or wireless network, a private network, a virtual private network, or other networks. In various embodiments the user computer 120 may be implemented on a computer running a Microsoft operating system, MacOS, various flavors of Linux, UNIX, Palm OS, and/or other operating systems. The user computer 120 executes a web browser (not shown) for interpreting HTML or other display instructions in a web page and displaying the content accordingly to a user.

The user computer 120 executes a bill payment application 110. The bill payment application 110 is comprised of a number of executable code portions and data files. In one embodiment, the bill payment application 110 aggregates information from all financial institutions affiliated with the user and allows a user to check account balances and to sort all the payments quickly and easily. The bill payment application 110 enrolls a user with bill payment service system 150 in the following manner. The bill payment application 110 prompts a user to provide a choice of a financial institution at which the user maintains one or more accounts. A user provides to the bill payment application 110 the user's authentication information, such as user ID and password, to access the user's financial institution 170. The bill payment application 110 obtains the address of the financial institution from data file 230 (described below in reference to FIG. 2) and establishes connection with the financial institution 170. From the financial institution 170, the bill payment application 110 obtains the user's account information, e.g., account number and routing number. The bill payment application 110 provides the user's account information to the bill payment service system 150 to enroll the user. The connections between the bill payment application 110 and the financial institutions 170, and between the bill payment application 110 and the bill payment service 150, are preferably made using a secure communications protocol (e.g., HTTPS).

In another embodiment, the bill payment application 110 is a web-based application executed on a server (not shown in FIG. 1). When bill payment application 110 is implemented as a web-based application, a user accesses bill payment application 110 over a communication network, such as the Internet, and particularly, the World Wide Web portion thereof, or any other communication mechanism that is capable of supporting communication between a user and the bill payment application 110. In yet another embodiment, bill payment application 110 is integrated into a third party system or framework (not shown in FIG. 1) or a third party portal. The bill payment application 110 can also be integrated in a general financial management application, such as a personal finance application like Quicken® of Intuit, Inc., of Mountain View, Calif., or a business accounting application, like Quick-Books® also provided by Intuit, Inc.

Figure 2:
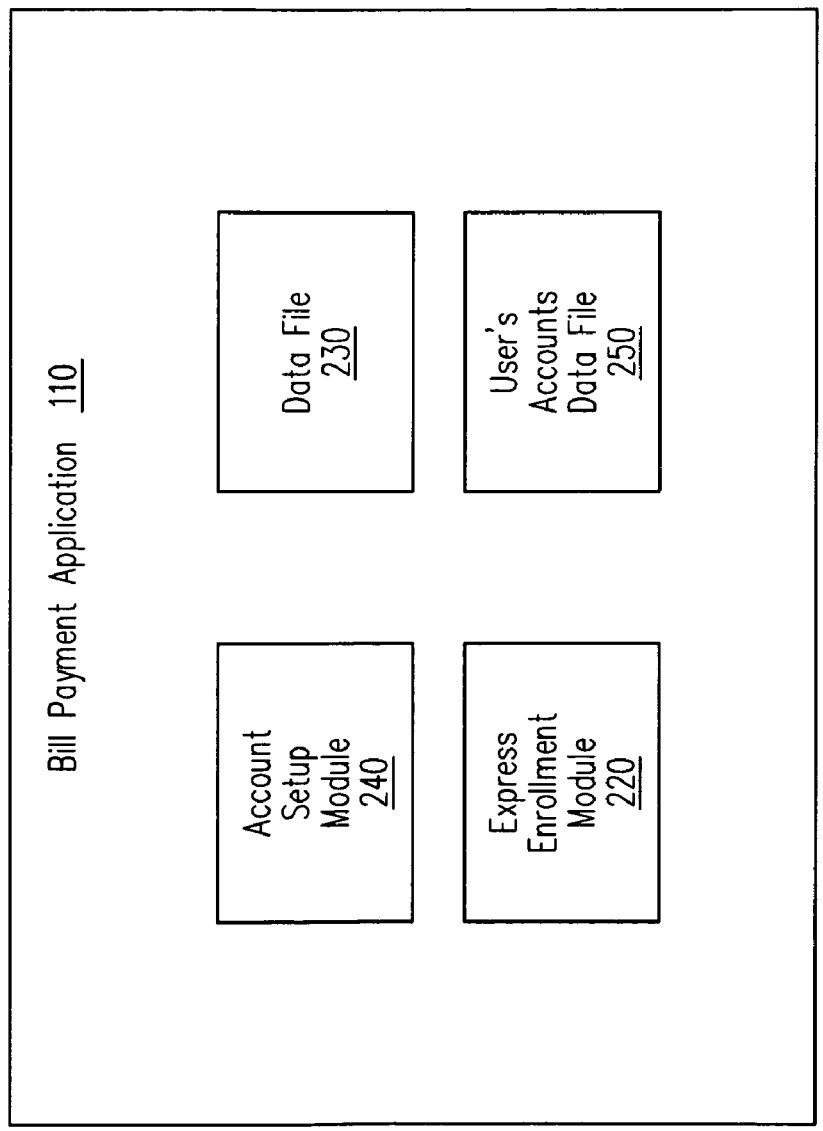
FIG. 2 is a block diagram illustrating the architecture of one embodiment of a bill payment application.

Referring now to FIG. 2, a block diagram illustrating the architecture of one embodiment of the bill payment application 110 is shown. The bill payment application 110 includes an express bill enrollment module 220, an account set up module 240, a data file that maintains a list of financial institutions 230, and user's accounts 250.

Account set up module 240 is an example of one means for establishing an account with a financial institution within bill payment application 110. Account set up can include receiving a user selection of a financial institution, identifying what information has to be submitted to the financial institution to receive user account information, receiving user authentication information for the financial institution (e.g., user ID and password), identifying the address of the financial institution, establishing connection with the financial institution to request the user's account information (e.g., account number and routing number), and providing the received information to the express bill enrollment module 220 to enroll the user.

Express enrollment module 220 is an example of one means for providing express enrollment of a user with bill payment service system 150. Module 220 receives user account information from account set up module 240 and provides this information to bill payment service system 150 to enroll a user. In addition, module 220 provides user name, address, social security number, and other information required to enroll the user with the bill payment service system 150.

Data file 230 is an example of one means for maintaining information about various financial institutions. The data file 230 maintains a plurality of records, with each record storing information about a particular financial institution. A typical record in data file 230 stores a unique ID of a financial institution, information about a financial institution, such as whether it provides for a web-enabled access, and a URL address of the financial institution, and connection setup information (including security information). The data file 230 is used by the account set up module 240 to provide the list of financial institutions from which the user can select, and to obtain from the user the communication and connection information for a selected financial institution.

User's accounts 250 is an example of one means for maintaining user account information, such as a unique name of the financial institution with which a user has an account(s), type of the account(s), URL of the financial institution, and privileges (e.g. whether a user has a web-enabled access to the financial institution).

Figure 4:
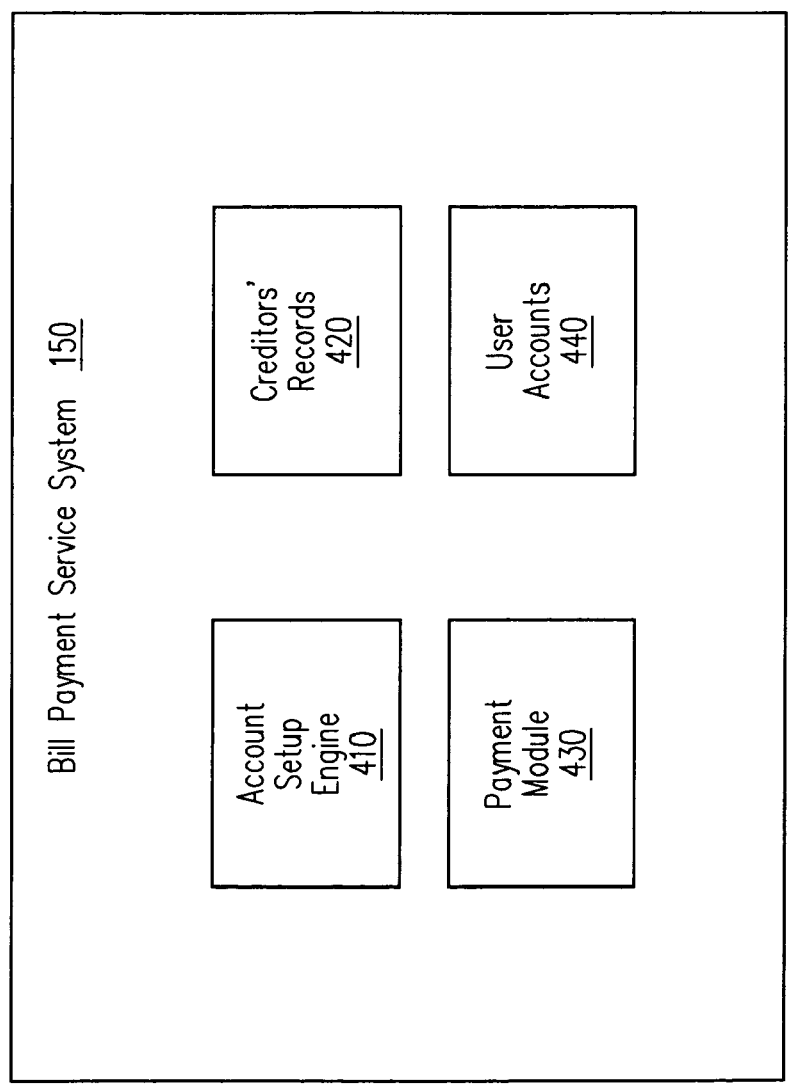
FIG. 4 is a block diagram illustrating the architecture of one embodiment of a bill payment service system.

FIG. 4 is a block diagram of the system architecture of the bill payment service system 150. The bill payment service system 150 includes an account setup engine 410, creditors' records 420, payment module 430, and user accounts 440.

Account set up engine 410 is an example of one means for establishing an account with a user. Account set up can include receiving, from bill payment application 110, user information, such as name, date of birth, Social Security Number, as well as funding information (one or more account numbers and routing numbers) and establishing an account for the user.

Creditors' records 420 are an example of one means for maintaining information about the user's creditors. A typical record in creditors' records 420 stores a creditor's ID, name, address, the form of payment the creditor accepts, as well as the amount of payment; additional information such as payment terms may be included as well. The term "creditor" as used herein refers to any person or entity that the user owes money. The user may indicate whether the amount of payment is fixed or varies from month to month. The user may also indicate the date when the payment should be made and the frequency of payments, such as weekly, monthly, quarterly, etc. A user can periodically update the creditors' records to reflect the changes.

Users' accounts 440 is an example of one means for maintaining user account information, such as a unique name of the financial institution with which a user has an account(s), type of the account(s), and the users' contact information. This information is used by the payment module 430 to make the payments.

Payment module 430 is an example of one means for automatically paying the bills. Payment module 430 can include receiving instructions from the user to make automatic payments, use creditors records 420 and users' accounts 440 to obtain the user's account number and creditor(s) account number, and make the payment. Payment module 430 can use various mechanisms to pay the bills. For example, payment module 430 can issue a check drawn on the user's account and send the check to a creditor. Payment module 430 can make an electronic transfer payment on behalf of the user.

Figure 3:
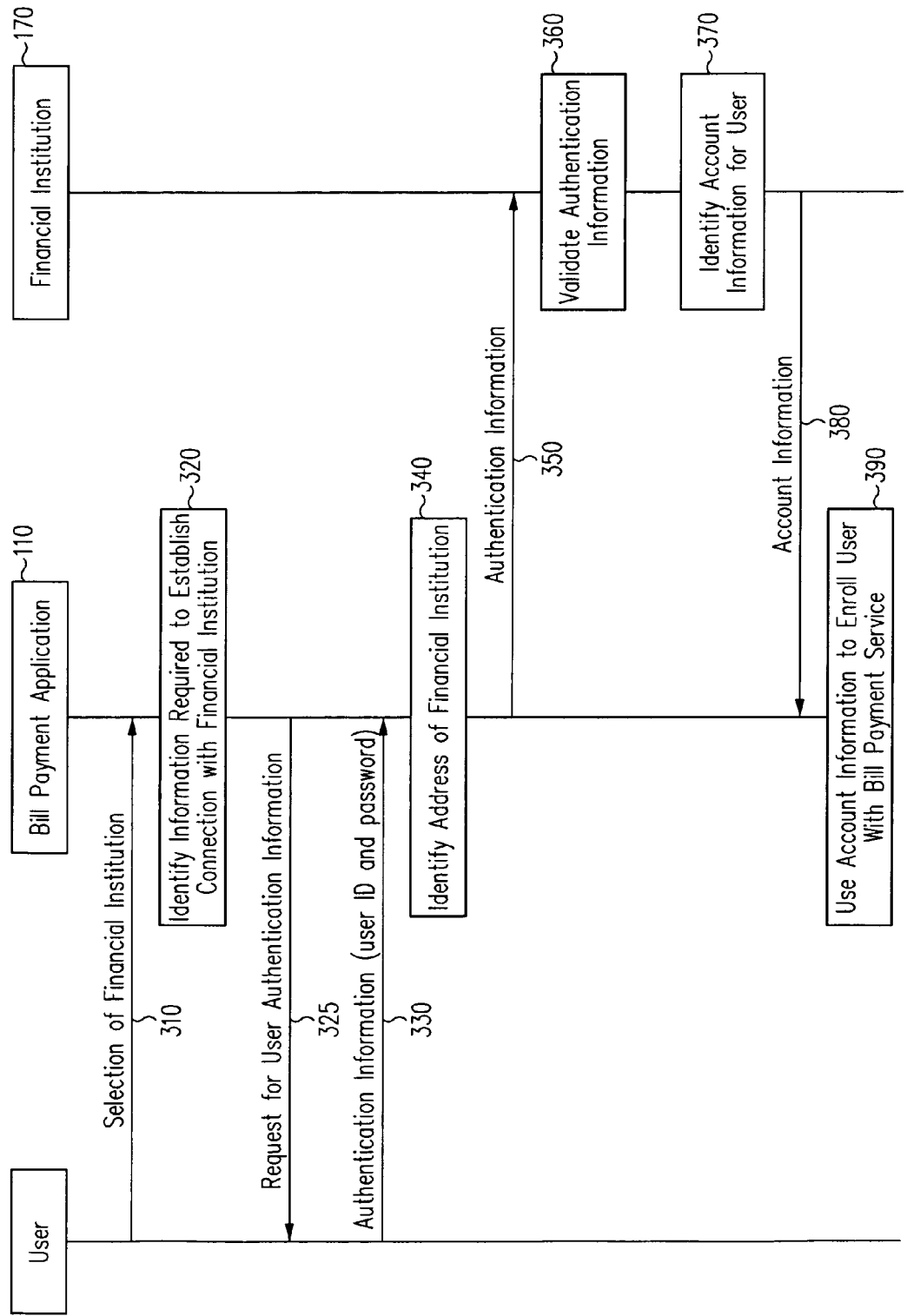
FIG. 3 is an event diagram of one embodiment of a method for express bill payment enrollment.

Referring now to FIG. 3, an event diagram illustrating exemplary transactions performed by a user, a bill payment application 110, and a financial institution 170 are shown. In FIG. 3, these entities are listed across the top. Beneath each entity is a vertical line representing the passage of time. The horizontal arrows between the vertical lines represent communication between the associated entities. It should be noted that not every communication between the entities is shown in FIG. 3. In other embodiments of the present invention, the order of the communication can vary.

The user initiates the process by executing the bill payment application 110 on the user computer 120. The application 110 provides the user with an interface from which to select 310 a financial institution. The user provides to the bill payment application 110 his or her selection of the financial institution. Bill payment application 110 determines 320 what information is needed to establish connection with the financial institution. To this end, bill payment application 110 queries data file 230. For example, if according to a record in the data file 230, a user ID and password are required to establish connection with the financial institution, bill payment application 110 prompts a user 325 to provide a user ID and password for the selected financial institution. In response, a user provides 330 the user ID and password. Bill payment application 110 identifies 340 from user's accounts 250 a URL address of the financial institution. At step 350, bill payment application 110 establishes connection with financial institution 170. In one implementation, bill payment application 110 uses Open Financial Exchange (OFX) protocol to establish connection with the financial institution 170's server 175 and make the various requests. Bill payment application 110 creates a request that includes user authentication information, such as user ID and password, and sends the request to the server 175.

The server 175 receives the request and provides the user ID and password to the legacy system 177 to validate 360 the user authentication information against valid user ID's and passwords stored by the legacy system 177. If the provided user ID and password are valid, the financial institution 170 (via the server 175) provides 370 account information, such as account number and routing number, that belong to the user identified by the validated user ID and password. Financial institution 170 sends 380 account information to bill payment application 110.

The bill payment application 110 receives the account information from the financial institution 170 and communicates with the bill payment server system 150 to enroll 390 the user. In one embodiment, this communication is also made via the OFX protocol. The bill payment application 110 provides the account number(s) and a routing number for the user's financial institution to the bill payment service system 150. In addition, the bill payment application 110 establishes an account for a user with system 150. At a subsequent time, the user can access the bill payment service system 150 and provide payment instructions to the service system 150 to make payments to the user's creditors. When the user accesses the bill payment service system 150 in this regard, the user need only identify the creditor to receive the payment, the amount of the payment, the source account, and other payment specific information.

Thus, the present invention allows a user to enroll with a bill payment service system without requiring a user to provide account information. Since the account information is provided programmatically from the financial institution rather than directly from a user, this eliminates the possibility of fraud.

The present invention has been described in particular detail with respect to the two possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for performing express enrollment of a user with a bill payment service, the system comprising:
    an account set up module adapted to:
    receive a user selection of a financial institution at which the user maintains one or more accounts;
    receive the user's authentication information for accessing one or more of the user's one or more accounts with the selected financial institution;
    obtain an address of the financial institution in response to the selection;
    send a request to the financial institution for user account information using the address of the financial institution; and
    an express bill payment enrollment module adapted to receive the user account information and to enroll the user with the bill payment service using the user account information.

2. The system of claim 1, further comprising a first data file adapted to store an ID of one or more financial institutions and an address of the one or more financial institutions.

3. The system of claim 1, further comprising a second data file adapted to store user account information.

4. The system of claim 1, wherein the bill payment module is further adapted to establish an account for the user with the bill payment service.

5. The system of claim 1, wherein the address of the financial institution includes a URL address.

6. The system of claim 1, wherein the user account information includes an account number and a routing number.

7. A computer program product comprising:
    a computer-readable medium having computer program code embodied therein for performing express enrollment of a user with a bill payment service, the computer program code adapted to:
    receive a user selection of a financial institution at which the user maintains one or more accounts;
    receive the user's authentication information for accessing one or more of the user's one or more accounts with the selected financial institution;
    obtain an address of the financial institution, in response to the selection;
    send a request to the financial institution for user account information using the address of the financial institution;
    receive from the financial institution user account information; and
    enroll the user with the bill payment service using the account information.

8. The computer program product of claim 7, further adapted to establish an account for the user with the bill payment service.

9. The computer program product of claim 7, wherein the address of the financial institution includes a URL address.

10. The computer program product of claim 8, wherein the user account information includes an account number and a routing number.

* * * * *